United States Patent [19]

Kinoshita et al.

[11] 4,115,480
[45] Sep. 19, 1978

[54] METHOD OF PRODUCTION OF ACRYLIC RESIN FOR FILM USE AND AN ACRYLIC RESIN OBTAINED THEREFROM

[75] Inventors: Yoshikiyo Kinoshita, Suita; Takashi Aoi, Akashi; Yoshihiro Kimura, Settsu; Yumiko Amisaki, Toyonaka, Japan

[73] Assignee: Kanegafuchi Kagaku Kogyo Kabushiki Kaisha, Osaka, Japan

[21] Appl. No.: 859,917

[22] Filed: Dec. 12, 1977

Related U.S. Application Data

[63] Continuation of Ser. No. 603,330, Aug. 11, 1975, abandoned.

[30] Foreign Application Priority Data

Aug. 23, 1974 [JP] Japan ............................ 49-97276

[51] Int. Cl.² ............................................. C08L 31/02
[52] U.S. Cl. .................................................... 260/885
[58] Field of Search ....................................... 260/885

[56] References Cited

U.S. PATENT DOCUMENTS 3,804,925  4/1973  Kato et al. ......................... 260/885
3,812,205  5/1974  Dunkelberger ..................... 260/885

Primary Examiner—Carman J. Seccuro
Attorney, Agent, or Firm—Moonray Kojima

[57] ABSTRACT

A method of producing acrylic resin for use as a film and having reduced tendency to stress whitening and acrylic resins produced by such method. An elastomer is prepared by copolymerizing a cross-linking monomer with a monomer mixture comprising a major proportion of acrylic acid alkyl ester containing 1 to 8 carbon atoms in the alkyl group and having gel content of more than 60%, degree of swelling of less than 15 and mean particle size of 500 to 2000 Å. A resin component comprising a major proportion of methacrylic acid alkyl ester containing 1 to 4 carbon atoms in the alkyl group is graft polymerized to a degree of grafting of over 30% in an emulsion of the elastomer to produce the desired resin.

16 Claims, No Drawings

METHOD OF PRODUCTION OF ACRYLIC RESIN FOR FILM USE AND AN ACRYLIC RESIN OBTAINED THEREFROM

This is a continuation of application Ser. No. 603,330, filed Aug. 11, 1975, now abandoned.

BACKGROUND OF THE INVENTION

This invention relates to a method of producing acrylic resins useable in films and acrylic resins obtained by such method which is superior in transparency, toughness and has improved tendency to stress whiten without decrease of anti-weathering property.

Methyl methacrylate polymer is an useful synthetic resin, economically, since it has superior weathering properties and is used in various fields as formed products, such as prepared by casting, injection molding and extrusion molding. The main defect of this resin is its brittleness although it is hard. This has limited use of this resin. However, recently, various improved products having advanced toughness, much better than that of methyl methacrylate polymer itself, have been produced by, for example, methods employing the blending of an elastic component, grafting of methyl methacrylate to an elastic polymer or copolymerization of methyl methacrylate with a monomer which polymerizes to a soft polymer.

These products are now widely used in areas where materials are desired having such properties as softness, flexibility, after-workability and especially anti-weathering properties. For example, the products may be made either solely or mixed with other soft materials into films or sheets.

Among various methods for producing such materials, graft copolymerization is believed to be better than random copolymerization since the polymer obtained by graft copolymerization is superior to that obtained by random copolymerization from the standpoint of properties demanded for film or sheet, such as those above mentioned.

Further, in graft copolymerization, generally, a saturated elastomer is used in order not to decrease the characteristic antiweathering properties of the obtained graft polymer. The saturated elastomer may be a polymer of acrylic acid alkyl ester. There are various known methods for graft copolymerizing using the acrylic acid alkyl ester elastomer as the component to be grafted. Examples area: A method which introduces unsaturated group into the side chain of acrylic acid alkyl ester elastomer in order to improve the compatibility between the elastomer and the resin component which is obtained from the monomer mixture in the graft copolymerization. A method which adds methacrylic acid alkyl ester containing acrylic acid alkyl ester stepwisely into the reaction system in the presence of acrylic acid alkyl ester elastomer in order to obtain sufficient compatibility between the elastomer component and the resin component. A method which prepares a cross-linking structure in the molecule of acrylic acid alkyl ester elastomer as the resin reinforcing material. However, since the materials obtained by such method have a tendency to easily become stress whitened, their commercial value is decreased substantially.

For example, in the case where a graft polymer prepared by a conventional method exemplified above is used as a laminate on the surface of metallic plate or as material for building use, the polymer very often shows stress whitening phenomenon when subjected to secondary working, such as bending and cutting, at the position or about the position where the mechanical stress such as stretching, compression or impulse is applied. This, unfortunately, restricts the application and utility of the product. The stress whitening occurs by the appearance of crazes in the graft polymer when a stress is applied thereto. The applied stress is concentrated at the elastomer component whose modulus of elasticity is small. Thus, the refractive index of the part having such crazes decreases and a double refraction in the graft polymer occurs.

The crazes appear in the neighborhood of the interface between the elastic part and the resinous part of the graft polymer due to large differences of elastic modulus between the two or to poor binding between them. Accordingly, the occurrence of stress whitening can be delayed with a long induction period if the difference of elastic modulus is small or the binding force between the two parts is improved. Furthermore, it is certain that in case graft polymerization is carried out to graft a resinous component onto a saturated elastomer as a reinforcing material, since chemical bonding between them scarecely happens, many kinds of homopolymers co-exist. Accordingly, the interface between them is inhomogeneous and the obtained polymer has a tendency to become turbid. If stress is applied to such a polymer, it generates many crazes about the interfaces stressed concentratedly, that stress whitening is produced.

SUMMARY OF THE INVENTION

The present inventors have intensively studied the effects of the foregoing and other factors, such as degree of cross-linking of the elastomer itself, amount of resin component chemically or physically bonded to the elastomer component and the particle size of the elastomer in an emulsion state, and have discovered the following: First, by controlling the degree of cross-linking of the elastomer component in a characteristic definite range, the homogeneity of the elastomer is very much increased and the tendency of the graft polymerization to stress whiten is very much decreased. Moreover, the amount of resin component tightly bonded to the elastomer component can be controlled by the kind and amount of cross-linking agent used for the cross-linking of the elastomer or by the degree of cross-linking of the elastomer.

With the increase of degree of cross-linking, the amount of resin component tightly bonded to the elastomer increases. Of course, the reverse is also true. Moreover, the fact that the amount of the tightly bonded resin component has an important relationship to the stress whitening phenomenon has been confirmed.

Second, with the increase of particle size of the elastomer emulsion, the possibility of the generation of crazes increases and stress whitening more readily occurs. Taking into consideration the above factors, the present inventors have discovered a method of production of acrylic resins useful for films, which is superior in transparency and moreover has reduced or less tendency to whiten by stress.

Briefly, the method of the present invention encompasses the steps of preparing an emulsion elastomer by copolymerizing a cross-linking monomer with a monomer mixture consisting essentially of 100 to 70 weight percent acrylic acid alkyl ester containing 1 to 8 carbon atoms in the alkyl group, 0 to 30 weight percent methacrylic acid alkyl ester containing 1 to 4 carbon atoms in the alkyl group, and 0 to 20 weight percent of unsaturated monomer of ethylene series copolymerizable with the foregoing monomers in this step. The elastomer has a gel content of more than 60%, degree of swelling of less than 15 and mean particle size of 500 to 2000 Å. There is then graft copolymerized in an emulsion 10 to 50 parts by weight of the cross linked elastomer and 90 to 50 parts by weight of a resin component consisting essentially of a monomer mixture of 100 to 60 weight percent methacrylic acid alkyl ester containing 1 to 4 carbon atoms in the alkyl group, 0 to 30 weight percent acrylic acid alkyl ester containing 1 to 8 carbon atoms in the alkyl group and 0 to 10 weight percent of unsaturated monomers of ethylene series copolymerizable with said foregoing monomers of this step. The grafting is at least 30 percent.

DETAILED DESCRIPTION OF PREFERRED EMBODIMENTS

The method of the present invention comprises two steps. The first step is the preparation of an emulsion of a cross-linked elastomer. The second step is an addition copolymerization in the presence of the emulsion of the cross-linked elastomer obtained in the first step to graft a resin component onto the elastomer. In the following, the second step of the present invention is sometimes called grafting or graft copolymerization. Further, the degree of grafting means the amount (parts by weight) of the resin component (B) graft polymerized to 100 parts by weight of the cross-linked elastomer (A) or intimately combined with it chemically or physically immersing into the cross-linked elastomer by diffusion, and measured by a method to be explained hereinbelow. Thus, the degree of grafting may also be set forth as weight percents.

Acrylic acid alkyl ester used in the present invention for the elastomer component (A) and for the resin component (B) has an alkyl group having carbon number of 1 to 8 and may be straight chained or branched. Examples are acrylic acid methyl ester, acrylic acid ethyl ester, acrylic acid propyl ester, acrylic acid butyl ester, acrylic acid 2-ethyl-hexyl ester and acrylic acid n-octyl ester. Moreover, it is possible to use a mixture of two or more of them.

Methacrylic acid alkyl ester which may be copolymerized with the acrylic acid alkyl ester has an alkyl group having carbon number of 1 to 4 and may be straight chained or branched. Methacrylic acid methyl ester is a typical example and other examples are methacrylic acid ethyl ester, methacrylic acid propyl ester, methacrylic acid propyl ester and methacrylic acid butyl ester. Also any mixture of two or more of them may be used.

Examples of monomers of ethylene series which can be copolymerized with the above monomers are vinyl halides, such as vinyl chloride, vinyl bromides; vinyl cyanides, such as acrylonitrile, methacrylonitrile; vinyl esters, such as vinyl formate, vinyl acetate, vinyl propionate; aromatic vinyl compounds, such as styrene, vinyl toluene, alpha methyl styrene; derivatives of aromatic vinyl compounds, such as o-chloro-styrene, m-chlorostyrene, p-chlorostyrene; halogenated vinylidenes, such as vinylidene chloride, vinylidene fluoride; acrylic acid and its salts, such as acrylic acid sodium salt, acrylic acid potassium salt; derivatives of acrylic acid ester, such as beta-hydroxyethyl acrylate, dimethylaminoethyl acrylate, glycidyl acrylate, acrylic amide, N-methylol acrylic amide; methacrylic acid and its salts, such as sodium methacrylate, calcium methacrylate, ammonium methacrylate; and derivatives of methacrylic acid ester, such as beta-hydroxyethyl methacrylate, dimethyl aminoethyl methacrylate, glycidyl methacrylate. In the first step of preparing the emulsion of elastomer, one portion of acrylic acid alkyl ester, that is, at most 30 weight percent of it can be replaced by methacrylic acid alkyl ester. In order to increase the compatibility between the elastomer (A) and the resin component (B) to be obtained in the second step of polymerization, it is preferable to carry out the first step of polymerization as a copolymerization of a mixture of alkyl acrylate and alkyl methacrylate containing the latter in a concentration of 5 to 15 weight percent.

In the first step of polymerization, the mixture of acrylate and methacrylate can be partially replaced by an unsaturated monomer of ethylene series which can copolymerize with the monomer mixture, up to 20 weight percent or preferably up to 10 weight percent; the monomer mixture shall total 100 weight percent).

The upper limit of the content of methacrylic acid alkyl ester in the elastomer component above mentioned also comes from a consideration of the disadvantages of enhancing the glass transition temperature of the elastomer, that is, the glass transition temperature of the elastomer is desired to be lower than 0° C at highest, or more preferably, lower than $-10°$ C from the standpoint of the purpose of use. The first step of polymerization can be carried out charging the total amount of monomers at once or interruptedly. However, it is desirable to carry out the polymerization by adding them continuously, paying attention to the generation of heat of reaction.

In order to disperse homogeneously the emulsion of the elastomer component mainly consisting of acrylic acid alkyl ester obtained in the first step of polymerization, into the resin component (B) which is prepared in the second step of polymerization, it is necessary to make a cross-linked structure in the elastomer molecule, using a monomer having at least two function groups for polymerization.

The cross-linking monomer used for the above purpose in the present invention need not be a special one and any known cross-linking agent will do. Examples are cross-linking monomers not having allyl group (as set forth herein, cross-linking monomers having only vinyl groups will be called cross-linking monomers of the vinyl type) such as ethylene glycol dimethacrylate, diethylene glycol dimethacrylate, triethylene glycol dimethacrylate, trimethylol propane trimethacrylate, tetramethylol methane tetramethacrylate, dipropylene glycol dimethacrylate; those acrylates replacing said methacrylates, divinyl benzene and divinyl adipate. Cross-linking monomers having allyl group (herein these monomers will be referred to as cross-linking monomers of the allyl type) may be used, such as diallyl phthalate, diallyl maleate, allyl acrylate, allyl methacrylate and triallyl isocyanurate. Of course, it is possible to use any mixture of two or more of the foregoing.

In order to produce a resin for film use, having reduce or less tendency to stress whiten, the cross-linked elastomer should have more than 60% gel content and degree of swelling of below 15. The necessary amount of cross-linking monomer to be used is determined depending upon two conditions such as the content of gel and degree of swelling. In case of a cross-linking monomer of the vinyl type, the amount is desirably 0.5 to 5.0 weight percent to the amount of monomer mixture in general or more desirably 1.0 to 3.0 weight percent. In case a crosslinking monomer of the allyl type is used, it is desirably 0.2 to 5.0 weight percent or more desirably 0.3 to 1.0 weight percent to the amount of monomer mixture. The gel content and degree of swelling are measured by Japanese Industrial Standard JIS-K-6388, details of which are set forth below.

A certain definite amount of cross-linked elastomer is taken on a metallic net of 100 mesh and dipped into methyl ethyl ketone at room temperature. After dipping for 48 hours, the elastomer is taken out from the methyl ethyl ketone and wiped to take off the adhered methyl ethyl ketone on the surface of the sample and the weight of the sample is measured. The swelled elastomer is again dried in a vacuum dryer to expel the contained methyl ethyl ketone from the elastomer, until the weight of the elastomer becomes constant. The weight of the elastomer after the drying is measured.

The degree of swelling and the gel content can be calculated by the following:

$$\text{Degree of swelling} = \frac{\left(\begin{array}{c}\text{Weight of elastomer}\\ \text{after swelling in}\\ \text{methyl ethyl ketone}\end{array}\right) - \left(\begin{array}{c}\text{Weight of elastomer}\\ \text{after vacuum drying}\end{array}\right)}{(\text{Weight of elastomer after vacuum drying})}$$

$$\text{Gel Content (\%)} = \frac{\left(\begin{array}{c}\text{Weight of elastomer after}\\ \text{vacuum drying}\end{array}\right)}{(\text{Weight of sample})} \times 100$$

Since the gel content and degree of swelling of the elastomer component become different depending upon the kind and amount of cross-linking monomer and upon other polymerization condition, such as polymerization temperature, kind and amount of initiator, and use or non-use of molecular weight regulating agent, the preferable amount of cross-linking agent and other conditions to practice the invention can be selected to be in the ranges disclosed herein. In case of resin for film use produced by using an elastomer component whose gel content is less than 60%, the dispersion state of the cross-linked elastomer in the resin component sometimes changes its state with the working condition for preparation of film, resulting in an unevenness of the product or the product has a tendency to be easily stress whitened. Furthermore, sometimes, it becomes difficult to continue the working for preparation of film and the strength of the obtained film also decreases. On the other side, if an elastomer component having a degree of swelling larger than 15 is used for the production of resin for film use, the obtained resin has a tendency to easily whiten by stress.

The initiator of polymerization used in the method of the present invention is not special and may be any ordinary one used in free radical polymerization. Moreover, the same or different initiators may be used in the two steps of polymerization. Practical examples are inorganic peroxides, such as potassium persulphate, sodium persulphate; organic hydroperoxides, such as cumene hydroperoxide, p-methane hydroperoxide, ditertialy-butyl hydroperoxide; organic peroxides, such as benzoyl peroxides, lauroyl peroxide, cumene peroxide and oil soluble initiators such as azo isobutylonitrile.

Furthermore, an ordinary initiator of redox system can also be used, such as those initiators mentioned above combined with reducing agents, such as sodium sulphite, sodium hydrogen sulphite, sodium thiosulphate, sodium formaldehyde sulfoxylate, glucose, polyamine ascorbic acid, hydroxyacetone. The amount of initiator used both in the first and second step of polymerization is preferably 0.1 to 1.0 weight percent (based on the total amount of monomers) or more preferably 0.1 to 0.3 weight percent in each step.

An ordinary surface active agent for emulsion polymerization can also be used. Examples are anionic surface active agents, such as sodium, potassium and ammonium alkyl sulphates whose carbon number is 8 to 20, sodium, potassium and ammonium alkyl benzene sulfonates, sodium, potassium and ammonium salts of carboxylic acids of aliphatic series such as lauric acid, stearic acid, palmitic acid; and non-ionic surface active agents such as alkyl phenols, aliphatic alcohols and reaction products of ethylene oxide with alkyl phenols, aliphatic alcohols and polypropylene oxides. Of course, if desired a mixture of two or more can be used. Furthermore, it is possible to add an auxiliary surface active agent such as sulfonates condensed with naphthalene formaldehyde.

Moreover, if desired, cationic surface active agents such as alkyl amine hydrochloric acid salts can also be used. The amount of surface active agent is preferably 0.5 to 3.0 weight percent, based on the total amount of monomers, or more preferably 1.0 to 2.0 weight percent.

The polymerization conditions can be selected to be the same or different in each of the two polymerization steps. The temperature of polymerization should be generally within the range of 10° C to 95° C and more preferably from 30° C to 80° C, although it is possible to carry out the emulsion polymerization at a high temperature than 100° C under pressure. At the preferred temperatures the pressure is normal pressure. Although the aqueous dispersion medium can be used in any amount, preferably 60 to 400 parts by weight to 100 parts of monomer or mixture of monomers and polymers, or more preferably 80 to 250 parts by weight, of the aqueous medium is used. The medium may be water.

Furthermore, if desired, molecular weight regulating agent, antioxidant, stabilizer for after working, pigments, etc can be added. However, it is preferable to omit such an agent as the molecular weight regulator since better results for increase of degree of grafting can be obtained by its omission. Even if a molecular weight regulator is used, the amount should be less than 0.3 weight percent based on the total amount of monomers. Examples of molecular weight regulators which can be used are t-dodecyl mercaptan, secondary butyl mercaptan, n-dodecyl mercaptan, Moreover, in the first step of polymerization, it is important to adjust the particle size of the elastomer emulsion to be preferably within the range of 500 to 2000 Å, by use of a suitable amount of surface active agent and aqueous medium, which suitable amount should be within the ranges set forth above. In case the particle size is smaller than 500 Å, the mechanical strength of the prepared film decreases and in case the particle size is larger than 2000 Å, the tendency to stress whiten is now greater.

In the second polymerization step, copolymerization of a monomer mixture mainly comprising methacrylic acid alkyl ester is carried out, in the presence of elastomer emulsion obtained from the first step of polymerization, having 10 to 50 parts by weight solid content of elastomer, in order to produce 90 to 50 parts by weight of resin component. If the amount of cross-linked elastomer component (A) is less than 10 parts, the softness or flexibility of the obtained resin is insufficient and on the other side, if the amount is more than 50 parts by weight, the hardness and the softening point of the obtained resin decrease considerably and the workability for the preparation of film is too poor as it becomes scarecely possible to use practically.

Although the practical procedure in the second polymerization step to graft the resin component to the elastomer component can be done in any way, it is desirable to proceed by adding continuously a mixture of monomers for the resin component, in order to attain a distinct effect of the present invention.

In this step of polymerization, as already mentioned, it is possible to replace a portion of methacrylic acid alkyl ester with acrylic acid alkyl ester in an amount up to 30 weight percent.

Furthermore, if desired, it is possible to replace the mixture of methacrylate and acrylate with an unsaturated monomer of ethylene series which is copolymerizable with the monomers in an amount of up to 10 weight percent. If the content of acrylic acid alkyl ester is more than 30 weight percent, the hardness and the softening point of the obtained resin decrease and a deficiency occurs such as blocking.

Moreover, the most important aspect of the second polymerization step is to realize an intimate combination of the elastomer component (A) and the resin component (B), chemically or physically, since this is very important to enhance the compatibility between them. The reason why the intimate combination of the two components (A) and (B) is so important is as follows. Since the resin component (B) prepared by polymerization in the second step can be scarecely bonded chemically to the saturated elastomer component (A) such as used in the present invention, if the polymerization is carried out in a conventional way without taking any special precaution, against the case where an unsaturated elastomer is used as elastomer component (A), there co-exist many homopolymers in the obtained resinous system producing insufficient contact between the resin component and the elastomer component. This non-uniformity of the resinous system tends to produce a stress whitening easily by the concentration of stress in the area about the interface between the two components. However, when the amount of resin component bonded to the cross-linked elastomer component (that is the degree of grafting as defined above) is increased to more than 30%, the stress whitening tendency can be considerably decreased.

On the other hand, it can be pointed out that, in the method of grafting the monomer of the resin component to the cross-linked elastomer component, the degree of grafting can be controlled by such factors as the procedure for adding the monomer of the resin component, the concentration of monomer, the concentration of initiator, the amount of emulsifier, the amount of addition of molecular weight regulator agent, the mean particle size of the cross-linked elastomer emulsion, and temperature of graft polymerization, where such factors are present.

Since the graft reaction of the monomer of the resin component may occur by the diffusion of it into each particle of the cross-linked elastomer emulsion, the degree of grafting increases with the increase of the contact time of both components. On the other hand, the increase of the concentration of the monomer of the resin component or the increase of the concentration of initiator acts to increase the amount of ratio of the homopolymer and accordingly, results in the decrease of the degree of grafting. The increase of the concentration of the cross-linked elastomer component increases the degree of grafting.

Moreover, if the temperature of the graft polymerization is high, the degree of grafting becomes large. If a molecular weight regulating agent is added into the monomer mixture of the resin component, the degree of grafting decreases. The control of the degree of grafting can be also possible by other conditions such as the addition or non-addition of emulsifier or the amount of the added emulsifier and the kind of initiator.

The degree of grafting of the product obtained by the second polymerization step should be higher than 30%, as already mentioned This can be realized utilizing those factors explained above, such as by using a cross-linked elastomer as the elastomer component, whose gel content is above 60% and degree of swelling is less than 15.

The polymer latex obtained by the second polymerization is coagulated using a proper agent, for example, using a salt, and washed with water and dried to obtain a resin, or the resin is recovered by a spray drying or by freeze drying.

Furthermore, the degree of grafting, that is the amount of the resin component bonded to the cross-linked elastomer component was determined in the following way. One gram of a sample was placed into a conical flask of 100 cc capacity. 40 to 45 cc of methyl ethyl ketone was added to it. The mixture was allowed to stand for 1 night. Then, it was separated into an insoluble part and a solution by a centrifuge (40,000 rpm × 30 min), wherein the insoluble part was received into a weighing bottle and dried in vacuum. On the other hand, the solution was concentrated by evaporation and the solute was precipitated by adding 2 cc of water, 80 cc of methanol and a suitable amount of $CaCl_2 \cdot 2H_2O$, then filtered and dried in a vacuum. The former is a grafted elastomer and the latter is a free polymer not grafted.

The amount of the resin component grafted to the cross-linked elastomer is determined by the following relation:

$$\text{(Amount of resin grafted to cross-linked elastomer) (\%)} = \frac{\left(\begin{array}{c}\text{amount of}\\ \text{grafted}\\ \text{elastomer}\end{array}\right) - \left(\begin{array}{c}\text{amount of}\\ \text{cross-linked}\\ \text{elastomer}\end{array}\right)}{\text{(amount of cross-linked elastomer)}} \times 100$$

The invention will now be further illustrated by actual examples, which are not to be construed to be limiting of the invention.

EXAMPLE 1

After adding 200 weight parts of distilled water and 1.0 parts (in this specification and claims, all parts and percents are in terms of weight) of sodium dioctyl sulfosuccinate as an emulsifier into a polymerization vessel of 8 liter capacity, provided with a stirrer, a thermometer, an introducing pipe for nitrogen, a supplying tube for monomer and a reflux condenser, 30 weight parts of a monomer mixture consisting of 85 weight percent butyl acrylate, 15 weight percent methyl methacrylate and 0.1 weight percent triallyl isocyanurate as a cross-linking monomer and cumene hydroperoxide preliminarily dissolved in the monomer mixture (0.1 wweight percent to the amount of monomer mixture) were added into the polymerization vessel and the vapor phase of the vessel was sufficiently replaced with nitrogen gas. Then, setting the polymerization temperature at 40° C, under effective agitation, the first step of polymerization was carried out adding an aqueous solution of sodium formaldehyde sulfoxylate (0.1 weight percent to the total amount of monomers, and dissolved in a small amount of water), gradually. After 4 hours of polymerization time, the first step of polymerization was almost completed with conversion rate of more than 95%. The cross-linked elastomer latex thus obtained had such properties as gel content of 96.4%, degree of swelling of 7.3 and mean particle size of the cross-linked elastomer latex was 1,450 Å.

Next, elevating the temperature of polymerization up to 80° C and continuing the passage of nitrogen stream and the agitation, 70 weight parts of a monomer mixture consisting of 90 weight percent methyl methacrylate and 10 weight percent butyl acrylate and cumene hydroperoxide (0.3 weight percent to the amount of monomer mixture) as an initiator of polymerization, were intimately mixed together. On the other hand sodium formaldehyde sulfoxylate (0.2 weight percent to the amount of monomer mixture) dissolved in a small amount of water was added at once into the polymerization vessel before the beginning of the second polymerization step. Then, the second polymerization step was carried out feeding the monomer mixture gradually for about 4 hours by a supplying pump.

The polymer latex thus obtained was coagulated by salting out with $CaCl_2$ and heated at 80° to 90° C for 30 minutes under agitation and then cooled down. The obtained resin was dehydrated and dried. After the preparation of a pellet from the resin thus obtained, by use of an extruder, a film having thickness of 75 micron was prepared by use of an inflation moulding at 200° C of the dice temperature.

The property of the obtained film was 320 kg/cm² to tensile strength, 74% of breaking elongation and 18,400 k/cm² of Young modulus. The film was coated on a cold stretched steel plate of 0.5 mm thickness gilded with zinc, using an adhesive agent and the coated sample was tested by the use of the impact testing method of the DuPont System (a load of 5 kg having a tip dimension of ¼ feet R, was dropped from a height of 50 cm, at room temperature). The film was not destroyed, and moreover, showed no tendency to whiten at the position and in the neighborhood of the impact site.

EXAMPLE 2

Two steps of polymerization were carried out using the same compositions and using the same polymerization conditions as in Example 1, except the kind and amount of cross-linking agent. In Table 1, the results of polymerization are shown together with those of Comparative Example and in Table 2, the properties of the films prepared from the resins obtained by the polymerization are shown together with those of the comparative examples.

It is clear from the results shown in Tables 1 and 2 set forth hereinbelow, that although the films prepared from resins in the Comparative Example having gel content smaller than 60%, degree of swelling of more than 15, and amount of resin bounded to elastomer was less than 30%, showed a remarkable tendency to stress whitening, the film prepared from those resins obtained by the method of this invention scarecely showed stress whitening and were very superior.

TABLE 1

| | Sample No. | Cross-linking agent | Amount of addition (wt %) | Mean Particle[1] diameter of Elastomer (A) | Degree of Cross-linking[2] | | Amount of Rosin grafted to Elastomer (%)[3] |
|---|---|---|---|---|---|---|---|
| | | | | | Gel Content (%) | Degree of swelling | |
| example 2 | A-1 | Diallyl phthalate | 0.7 | 1460 | 91.2 | 8.3 | 48.9 |
| | A-2 | Allyl methacrylate | 0.3 | 1630 | 93.8 | 6.2 | 100.3 |
| | A-3 | Tetraethylene glycol acrylate | 1.0 | 1700 | 89.2 | 8.1 | 43.0 |
| | A-4 | Allyl maleate | 1.0 | 1490 | 90.1 | 7.2 | 66.8 |
| | A-5 | Triallyl isocyanurate | 0.2 | 1410 | 89.6 | 6.9 | 98.8 |
| comparative example | A-11 | Tetraethylene glycol dimethacrylate | 0.2 | 1780 | 60.2 | 19.5 | 13.0 |
| | A-12 | Allyl methacrylate | 0.01 | 1620 | 38.7 | 39.0 | 8.7 |
| | A-13 | Diallyl phthalate | 0.1 | 1580 | 40.8 | 25.6 | 7.2 |
| | A-14 | Divinyl benzene | 0.2 | 1680 | 26.0 | 30.5 | 6.1 |

TABLE 2

| | Properties of film [4] | | | |
|---|---|---|---|---|
| Sample No. | Strength (kg/cm²) | Elongation (%) | Impact Test of DuPont System[5] | Remarks |
| A-1 | 312 | 78 | no whitening | Example 2 |
| A-2 | 308 | 86 | no whitening | Example 2 |
| A-3 | 319 | 72 | faint whitening, but not obvious | Example 2 |
| A-4 | 302 | 80 | non whitening | Example 2 |
| A-5 | 298 | 86 | non whitening | Example 2 |
| A-11 | 306 | 82 | Completely whitened on entire surface | Comp. Ex. |
| A-12 | 320 | 41 | Completely whitened on entire surface | Comp. Ex. |
| A-13 | 318 | 38 | Whitened at impacted site | Comp. Ex. |

TABLE 2-continued

| Sample No. | Properties of film [4] Strength (kg/cm²) | Elongation (%) | Impact Test of DuPont System[5] | Remarks |
|---|---|---|---|---|
| A-14 | 306 | 38 | Completely whitened on entire surface | Comp. Ex. |

NOTES TO TABLES 1 and 2.

[1] The mean particle diameter of the elastomer latex was determined by the observation of the permeability of light of 546 mµ of wave length through a dilute sampe whose concentration of latex was 0.02 weight percent.
[2] Determined by the method already mentioned.
[3] Determined by the method already mentioned.
[4] The measurement was carried out using an autograph on the sample piece of dumbbell type of JIS-No. 1, applying 50 mm/min of stretching speed at 23° C.
[5] Using an impact tester of the DuPont type, 5 kg of load having a tip dimension of ¼'R, was dropped on the sample from a height of 50 cm at 23° C.
Each of the methods of measurements in all of the examples of this specification is the same as the above.

EXAMPLE 3

TABLE 3

| Sample No. | Amount of Emulsifier (to amount of monomers) (wt %) | Degree of cross-linking of elastomer Gel content (%) | Degree of swelling | Mean particle diameter of elastomer emulsion (Å) | Amount of resin bonded to elastomer | remarks |
|---|---|---|---|---|---|---|
| B-1 | 2.50 | 97.2 | 6.7 | 730 | 99.0 | Ex. 3 |
| B-2 | 1.25 | 96.4 | 7.1 | 1020 | 98.0 | Ex. 3 |
| B-3 | 0.70 | 95.6 | 7.5 | 1860 | 96.2 | Ex. 3 |
| B-11 | 0.30 | 95.0 | 7.5 | 3020 | 93.2 | Comp. Ex. |
| B-12 | 3.50 | 96.0 | 7.1 | 400 | 95.5 | Comp. Ex. |

TABLE 4

| Sample No. | Properties of Film Tensile Strength (kg/cm²) | Elongation (%) | Impact Test of DuPont System | remarks |
|---|---|---|---|---|
| B-1 | 322 | 72 | No whitening | Ex. 3 |
| B-2 | 310 | 75 | No whitening | Ex. 3 |
| B-3 | 319 | 78 | no whitening | Ex. 3 |
| B-11 | 302 | 86 | Whitening at impact site | Comp. Ex. |
| B-12 | 330 | 66 | No whitening, but film destructed | Comp. Ex. |

A series of experiments were carried out to show the effect of mean particle size of the elastomer emulsion to be obtained in the first step of polymerization of the two step polymerization using the same compositions and conditions as in Example 1, The amount of addition of sodium dioctyl sulfosuccinate as the emulsifier in the first step of polymerization was changed variously as shown in Table 3 in order to obtain various elastomer components of different sizes. The obtained results on the content of gel, degree of swelling, mean particle diameter of cross-linked elastomer emulsion and the amount of resin bonded to the elastomer, corresponding to the amount of the emulsifier are shown in Table 3 hereinbelow and the properties of films prepared from the obtained resins are shown in Table 4 hereinbelow.

As can be understood from Table 4, in case the mean particle diameter of elastomer emulsion is in the range of 500 to 2000 Å, the obtained film is not destroyed, and moreover, has no tendency to stress whiten when impact is applied. However, in case the particle size is larger than the state range, the prepared film has a strong tendency to stress whiten and in case the particle size is smaller than the state range, the prepared film is easily destroyed by impact although it has no tendency to stress whiten.

EXAMPLE 4

A series of polymerizations of two steps were carried out using the same conditions and procedures as Example 1, and using such combinations of two kinds of monomers for the first and second steps of polymerizations, as shown in Table 5 hereinbelow. Among the obtained results, those on the content of gel, swelling degree and mean particle diameter of elastomer emulsion are shown in Table 6 hereinbelow, and the properties of film are shown in Table 7 hereinbelow.

From the results shown in the Tables 5,6,7 hereinbelow, it can be understood that if the content of methacrylic acid methyl ester in the monomer mixture of the first step of polymerization is situated at the outside of the ranges of the present invention, the obtained film is brittle and easily destructed by impact test of the DuPont system. On the other hand, if the content of acrylic acid butyl ester in the second step of polymerization is situated outside of the range of the invention, the softening point of the obtained film decreases so that practically, the film cannot be used. Against those defects, the film prepared from the resin obtained using the ranges of the present invention, showed no tendency to stress whiten and had very superior other properties.

TABLE 5

| Sample No. | First step/ second step | Composition of Monomers of first step alkyl acrylate (wt %) | methyl methacrylate (wt %) | Composition of Monomers of second step Methyl methacrylate (wt %) | alkyl acrylate (wt %) | Remarks |
|---|---|---|---|---|---|---|
| C-1 | 30/70 | 100(butyl) | 0 | 80 | 20(butyl) | Ex. 4 |
| C-2 | 30/70 | 90(butyl) | 10 | 90 | 10(butyl) | Ex. 4 |

TABLE 5-continued

| Sample No. | First step/ second step | Composition of Monomers of first step | | Composition of Monomers of second step | | Remarks |
|---|---|---|---|---|---|---|
| | | alkyl acrylate (wt %) | methyl methacrylate (wt %) | Methyl methacrylate (wt %) | alkyl acrylate (wt %) | |
| C-3 | 30/70 | 70(butyl) | 30 | 85 | 15(2-ethyl hexyl) | Ex. 4 |
| C-4 | 30/70 | 90(ethyl) | 10 | 70 | 30(butyl) | Ex. 4 |
| C-11 | 30/70 | 60(butyl) | 40 | 80 | 20(butyl) | Comp. Ex. |
| C-12 | 30/70 | 80(butyl) | 20 | 50 | 50(butyl) | Comp. Ex. |

TABLE 6

| Sample No. | Mean particle Diameter of elastomer emulsion (Å) | Gel Content (%) | Degree of Swelling | Amount of Rosin Bonded to elastomer | Remarks |
|---|---|---|---|---|---|
| C-1 | 1480 | 96.1 | 6.9 | 69.8 | Ex. 1 |
| C-2 | 1320 | 95.6 | 7.2 | 70.2 | Ex. 4 |
| C-3 | 1300 | 93.4 | 7.0 | 69.0 | Ex. 4 |
| C-4 | 1410 | 94.1 | 6.8 | 68.8 | Ex. 4 |
| C-11 | 1600 | 95.2 | 7.5 | 79.1 | Comp. Ex. |
| C-12 | 1350 | 94.4 | 7.8 | 70.2 | Comp. Ex. |

TABLE 7

| Sample No. | Properties of film | | | Remarks |
|---|---|---|---|---|
| | Tensile Strength (kg/cm$^2$) | Elongation (%) | Impact Test of DuPont System | |
| C-1 | 295 | 92 | No whitening | Ex. 4 |
| C-2 | 322 | 62 | No whitening | Ex. 4 |
| C-3 | 308 | 86 | No whitening | Ex. 4 |
| C-4 | 268 | 98 | No whitening | Ex. 4 |
| C-11 | 299 | 78 | No whitening, but destructed | Comp. Ex. |
| C-12 | 128 | 201 | No whitening | Comp. Ex. |

The foregoing description illustrates the principles of the invention. Numerous variations and modifications thereof would be apparent to the worker skilled in the art. All such variations and modifications are to be considered to be within the spirit and scope of this invention.

What is claimed is:

1. An acrylic resin for film use having less tendency to stress whitening, produced by the method consisting essentially of the following two steps:

(A) copolymerizing a monomer having cross-linking ability with a mixture of monomers consisting essentially of 100 to 70 weight percent-acrylic acid alkyl ester containing 1 to 8 carbon atoms in the alkyl group, 0 to 30 weight percent methacrylic acid alkyl ester containing 1 to 4 carbon atoms in the alkyl group, and 0 to 20 weight percent unsaturated monomer of the ethylene series copolymerizable with said monomers of this step, thereby to produce a cross-linked elastomer having a gel content of more than 60%, a degree of swelling of less than 15 and mean particle size of 500 to 2000 Å; and (B) graft copolymerizing in an emulsion, 90 to 50 parts by weight of a resin component, in the presence of 10 to 50 parts by weight of said cross-linked elastomer obtained in step (A) without further addition of an emulsifier to effect degree of grafting of said resin component onto said elastomer of 43 percent or more by means of no addition of a molecular weight regulating agent, wherein said resin component consists essentially of 100 to 60 weight percent methacrylic acid alkyl ester containing 1 to 4 carbon atoms in the alkyl group, 0 to 30 weight percent acrylic acid alkyl ester containing 1 to 8 carbon atoms in the alkyl group and 0 to 10 weight percent of an unsaturated monomer of the ethylene series copolymerizable with said monomers of this step.

2. Acrylic resin of claim 1, wherein said methacrylic acid alkyl ester is selected from the group consisting of methyl ester, ethyl ester, n-propyl ester, iso-propyl ester, n-butyl ester and t-butyl ester.

3. Acrylic resin of claim 1, wherein said acrylic acid alkyl ester is selected from the group consisting of methyl ester, ethyl ester, n-propyl ester and n-butyl ester.

4. Acrylic resin of claim 1, wherein said unsaturated monomer of the ethylene series is selected from the group consisting of vinyl halides, unsaturated nitriles, vinyl esters, aromatic vinyl compounds, aromatic vinylidene compounds, vinylidene halides acrylic acids and acrylic acid salts.

5. Acrylic resin of claim 1, wherein the glass transition temperature of said cross-linked elastomer is below 0° C.

6. Acrylic resin of claim 1, wherein said monomer having a cross-linking ability is selected from the group consisting of ethylene glycol dimethacrylate, diethylene glycol dimethacrylate, triethylene glycol dimethacrylate, trimethylol propane trimethacrylate, tetramethylol methane tetramethacrylate, dipropylene glycol diemthacrylate, ethyleneglycol diacrylate, diethylene glycol diacrylate, triethylene glycol diacrylate, trimethyl propane triacrylate, tetramethylol methane tetracrylate, dipropylene glycol diacrylate, divinyl benzene, divinyl adimate, diallyl phthalate, diallyl maleate, allyl acrylate, allyl methacrylate and triallyl isocyanurate.

7. Acrylic resin of claim 1, wherein said cross-linked elastomer is a polymer obtained from acrylic acid butyl ester and methacrylic acid methyl ester.

8. Acrylic resin of claim 1, wherein said monomer having cross-linked ability is a monomer of the vinyl type and is used in an amount of 0.5 to 5.0 weight percent based on the weight of said monomer mixture.

9. Acrylic resin of claim 1, wherein said resin component is a polymer obtained from methacrylic acid methyl ester and acrylic acid buty ester.

10. Acrylic resin of claim 1, wherein said monomer having cross-linking ability is a monomer of the allyl type and is used in an amount of 0.2 to 5.0 weight percent based on the weight of said monomer mixture.

11. Acrylic resin of claim 1, wherein a polymerization initiator is used in both steps (A) and (B) in an amount of 0.1 to 1.0 weight percent based on the amount of monomer mixture in each step.

12. Acrylic resin of claim 1, wherein a surface active agent is used in an amount of 0.5 to 3.0 weight percent based on the amount of monomer mixture.

13. Acrylic resin of claim 1, wherein polymerization is carried out at temperatures within the range of 10° C to 95° C.

14. Acrylic resin of claim 1, wherein polymerization is carried out in an aqueous system using 60 to 400 parts water to 100 parts of monomer mixture or mixture of monomer and polymer.

15. An acrylic resin having reduced tendency to stress whitening, produced by the method consisting essentially of the following two steps;
(A) copolymerizing a monomer having cross-linking ability with a monomer mixture consisting essentially of
100 to 70 weight percent acrylic acid alkyl ester containing 1 to 8 carbon atoms in the alkyl group,
0 to 30 weight percent methyacrylic acid alkyl ester containing 1 to 4 carbon atoms in the alkyl group, and
0 to 20 weight percent of unsaturated monomer of the ethylene series copolymerizable with said foregoing monomers in this step, thereby to produce a cross-linked elastomer having a gel content of more than 60%, degree of swelling of less than 15, and mean particle size of 500 to 2000 Å; and
(B) grafting copolymerizing, without use of additional emulsifier, in an aqueous emulsion containing 10 to 50 parts of said cross-linked elastomer obtained in step (A) 90 to 50 parts of a monomer mixture consisting essentially of
100 to 60 weight percent methacrylic acid alkyl ester containing 1 to 4 carbon atoms in the alkyl group;
0 to 30 weight percent acrylic acid alkyl ester containing 1 to 8 carbon atoms in the alkyl group, and
0 to 10 weight percent of unsaturated monomer of the ethylene series copolymerizable with the said foregoing monomers in this step, and
wherein in each of steps (A) and (B), the temperature of polymerization is between 10° to 95° C; a polymerization initiator is used in an amount of 0.1 to 1.0 weight percent; a surface active agent is used in an amount of 0.5 to 3.0 weight percent; and the polymerization is carried out in aqueous medium of 60 to 400 parts liquid per 100 parts of said monomer mixture or mixture of polymer and monomer; and said cross-linking monomer is of the vinyl type used in an amount of 0.5 to 5.0 weight percent or of the allyl type used in an amount of 0.2 to 5.0 weight percent; and
wherein the degree of grafting of the resinous component of step (B) onto said elastomer of step (A) is 43 percent or more without use of any molecular weight regulating agent.

16. The method of claim 15, wherein said temperature is between 30° to 80° C, said initiator is in an amount of 0.1 to 0.3 weight percent; said surface active agent is used in an amount of 1.0 to 2.0 weight percent; said liquid is used in an amount of 80 to 250 parts per 100 parts of monomer mixture or mixture of polymer and monomer; and wherein said cross-linking monomer is of the vinyl type used in an amount of 1.0 to 3.0 weight percent or of an allyl type used in an amount of 0.3 to 1.0 weight percent.

* * * * *